United States Patent

Rodrigues et al.

[11] Patent Number: 4,671,985
[45] Date of Patent: Jun. 9, 1987

[54] THIN, DEFORMABLE COMPOSITE LAMINATE

[75] Inventors: Pedro Rodrigues, Schaffhausen, Switzerland; Ingo Büren, Hilzingen; Jürgen Timm, Steisslingen, both of Fed. Rep. of Germany

[73] Assignee: Swiss Aluminium Ltd., Chippis, Switzerland

[21] Appl. No.: 793,112

[22] Filed: Oct. 30, 1985

[30] Foreign Application Priority Data

Nov. 5, 1984 [CH] Switzerland .................. 5291/84

[51] Int. Cl.⁴ .................. B32B 7/02; B32B 15/08
[52] U.S. Cl. .................. 428/215; 428/401; 428/523
[58] Field of Search .................. 428/215, 461, 523

[56] References Cited

U.S. PATENT DOCUMENTS 4,313,996 2/1982 Newman et al. .................. 428/215

Primary Examiner—Thomas J. Herbert
Attorney, Agent, or Firm—Bachman & LaPointe

[57] ABSTRACT

A thin, plastically formable composite laminate features at least one metallic outer layer (14) and a core (10) of thermoplastic plastic. The metallic outer layers (14) exhibit a flat stress-strain curve which is similar to that of the plastic core (10) and is achieved by specific types of aluminum alloys and by specific alloy treatments. The, preferably 1.5–2.5 mm thick, composite laminates are employed for the manufacture of shaped parts in light weight constructions, especially in automobile, equipment and architectural applications.

14 Claims, 2 Drawing Figures

THIN, DEFORMABLE COMPOSITE LAMINATE

BACKGROUND OF THE INVENTION

The present invention relates to a thin, deformable composite laminate made up of a plurality of layers comprising at least one metallic outer layer and a plastic core. The laminates are usable for manufacturing shaped parts for light-weight constructions, in particular in automobile, equipment and architectural applications.

Composites comprising a thermoplastic plastic core and at least one outer layer of aluminum are preferred materials in automobile manufacture because of the low specific weight, good rigidity, and sound and vibration damping characteristics of such materials. A major problem that exists with these materials outside architectonic applications in buildings, for example in automobile applications, is the limited formability of such composite laminate materials. These sandwich type panels exhibits a low degree of bending and low stretch-drawing limit under biaxial loading conditions during the manufacture of component parts.

Described in the German patent publication No. DE-OS 19 55 969 is a process for manufacturing metal-plastic sandwich panels by laminating a strip of thermoplastic with at least one metal strip which is subjected to a heat treatment prior to the lamination step, the lamination being performed by passing the component strips in a continuous manner between a pair of rolls. The heat treatment before lamination is performed by passing the metal strip through a furnace situated immediately prior to the laminating rolls. In the said furnace the metal strip is first heated to the temperature required to produce the desired condition in the strip. The metal strip is then, if necessary, cooled to the temperature required to join it to the plastic strip. The alloys which have been solution heat treated prior to lamination can be plastically deformed more readily, then naturally age hardened. The solution treatment temperatures lie between 350° and 600° C. The device for carrying out the process features a continuous heat treatment furnace situated upstream of the laminating rolls and having three successive zones for heating up, holding at temperature and cooling the metal strip.

No. EP-A1 0 019 835 discloses a plastically formable metal-plastic-metal sandwich panel and a process for its manufacture. According to this publication the total thickness of the extremely thin composites made by that process is 0.125–1.625 mm, the thickness of the metal layers being only 0.05–0.5 mm and the thickness ratio of metal to plastic less than 9:1. The bending radius of these extremely thin composites at a bend of 90° C. is about the same as the total thickness of the composite.

No. EP-A1 0 019 835 contains many details of the composition of the plastic core, the use of adhesive foils, the incorporation of reinforcing elements in the plastic layer and the improved adhesion that is obtainable by a surface treatment.

Trials with outer layers of a heat treated AlMgSi alloy and a 1 mm thick plastic core of polypropylene or polyethylene revealed that the desired bending and stretch-drawing properties can not be achieved. Because of the small thickness of the metal outer layer (up to 0.25 mm), the three-layer (with two adhesive foils) or five-layer composites with thermoplastic plastic core tend to fail prematurely during shaping due to local necking of the aluminum or too little strength of the aluminum in relation to the elongation. These effects occur especially during the above mentioned bending and stretch-drawing. This shows that the thin composite laminates exhibit very poor plastic formability compared with aluminum sheet of the same rigidity.

Accordingly, it is the principal object of the present invention to develop a thin, plastically formable composite laminate having a plurality of layers including at least one metal outer layer and a plastic core wherein the laminate is suitable for manufacturing bent and/or stretch-drawn parts for light weight constructions. It should be possible to perform the deformation on conventional tools with the minimum of modification.

SUMMARY OF THE INVENTION

The foregoing object is achieved according to the invention by way of metallic outer layer/layers of an aluminum alloy which exhibits a flat stress-strain curve and a thermoplastic core of plastic.

A preferred version of the invention makes use of metal outer layer/layers of an alloy of 0.8–1.5 wt % Fe, up to 0.5 wt % each of Si and Mn such that the sum of Mn and Si amounts to 0.2–0.8 wt %, and other normal constituent elements each up to 0.3 wt % in total up to 0.8%, the rest of aluminum. The alloy is cast as ingot or strip and, after hot rolling of the ingot or strip material, is cooled at a rate of at least 0.5° C./sec to a temperature below 120° C., then cold rolled with a thickness reduction of at least 75% without intermediate annealing, and finally annealed at end thickness.

The aluminum alloy of the outer layer/layers preferably contains more than 1.1 wt % Fe and more than 0.25 wt % Mn such that the weight ratio of Fe to Mn lies between 2.5 and 4.5.

Particularly suitable is an outer layer/are outer layers of an aluminum alloy which, apart from Fe, Si and Mn, contains at most 0.1 wt % of each other chemical element.

Another preferred version of the invention employs a metallic outer layer/metallic outer layers of an alloy having 0.1–1.9 wt % Mn, 0.1–0.7 wt % Fe, 0.05–0.4 wt % Si, 0–1.0 wt % Mg, 0–0.3 wt % Cu, rest aluminum, which is cast as ingot or strip and, after hot rolling, is cooled at a cooling rate of at least 0.5° C./sec to a temperature below 120° C., then cold rolled with a thickness reduction of at least 75% without intermediate annealing and finally annealed at end thickness.

The thermplastic plastic chosen for both versions of the aluminum alloy used as the outer layer/layers is preferably a polyolefine, in particular a high density propylene or polyethylene.

Strengthening fibers of known materials, especially however glass or carbon fibers can be built into the thermoplastic plastic. This will significantly raise the strength and, depending on the type of fiber, in particular the rigidity; on the other hand strengthening fibers are a hindrance when bending the composite laminate.

If a thermoplastic plastic core with polar functioning groups is employed, this can be bonded to the metallic layers directly by heating and rolling with applied pressure i.e. the core material exhibits a self-adhesive effect.

If a thermoplastic plastic core without polar functioning group is employed, an adhesive or adhesive foil must be provided between the metal and the plastic. It is known that these are usefully of a copolymer of ethylene and ethylenic unsaturated carboxylic acid; the use of acrylic acid as the carboxylic acid is particularly suitable.

The outer metal layers are preferable 0.05–1 mm thick, in particular 0.25–0.4 mm. The core on the other hand is usually 0.5–3 mm thick, preferably 1.0–1.7 mm. For the laminate as a whole this gives a thickness between about 0.5 and 5 mm, preferably between about 1.5 and 2.5 mm.

Composite laminates with a thermoplastic plastic core and two adhesively bonded metal outer layers need not necessarily have the metal outer layers of the same thickness. One such layer can readily be thicker or thinner than the other layer. On bending the laminate the side with the thinner metal layer is usefully on the inside of the bent edge or deep-drawn material.

Surprisingly, the use of the thin plastically formable composite laminates according to the present invention with the specific metallic outer layers enables the attainable elongation to be increased by up to 50% over that attainable with metal outer layers of other alloy composition. The reason for this effect is that the elongation behavior of the aluminum alloys according to the present invention with their fine grained or subgrain structure is similar to that of the thermoplastic plastic core. The compatibility of the stress-strain curves of the aluminum alloy forming the outer layers and thermoplastic plastic of the core results in a wide range of quasi-stable elongation.

Various test series have shown that the minimum bending radius depends on the bending angle. For a bending angle of 90° the bending radius possible without delamination occuring can be lowered to a value corresponding approximately to that of the thickness. For a bending angle of 180° on the other hand, which is normal in folding operations, the minimum attainable bending radius is 1.2 times the thickness.

In other trials the behavior of the composite laminates according to the present invention under stretch-drawing conditions was investigated using the conventional so called, limiting dome height as the measure for that property. In that test the formability of the laminate is expressed as a percentage value which is derived as though the formability was achieved by a single metallic sheet corresponding to that of the outer material and having the thickness of the whole laminate.

Column 1, lines 60–65 of the U.S. Pat. No. 4,313,996 states that limiting dome height values of at least 60% can be obtained with thin composite laminates. On the other hand with the thin composite laminates with outer layers of composition according to the invention the lowest measured values were above 80%.

BRIEF DESCRIPTION OF THE DRAWINGS

The present invention will be described in greater detail in the following detailed description with the aid of exemplified embodiments.

DETAILED DESCRIPTION

Figure 1:
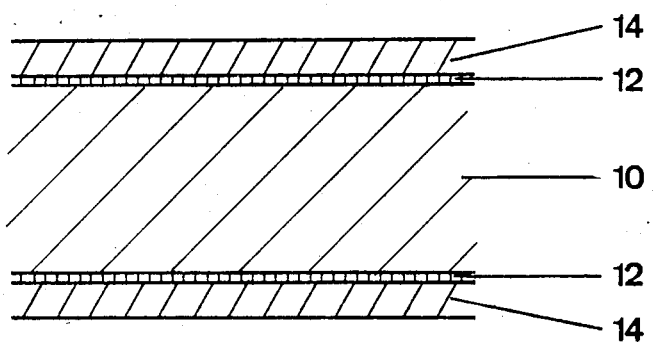
FIG. 1 is a cross-section through part of a thin, plastically formable composite laminate.

The composite laminate shown in FIG. 1 comprises a 1.1 mm thick core 10 of polypropylene with two metal outer layers 14 of an aluminum alloy according to the present invention having an iron content of 1.4 wt % and a manganese content of 0.4 wt %, the said metal layers being bonded to the core layer 10 by two adhesive foils 12 of PP bonding sheet X 22 519 supplied by the company Hercules.

Figure 2:
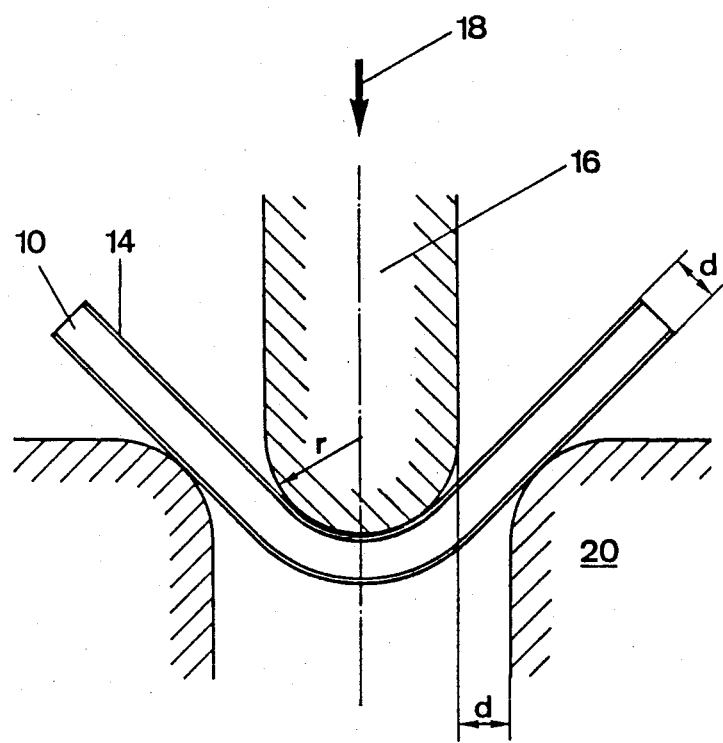
FIG. 2 is a known device for bending composite laminates 180° C.

The thin composite laminate 10, 12, 14, shown in FIG. 2 is in the process of being pressed in direction 18 into a slit-shaped opening in a die 20. The width of the slit-shaped opening in the die 20 corresponds to the sum of twice the bending radius r and twice the thickness d of the laminate 10, 12, 14. For reasons of clarity the bending radius r has been chosen disproportionately large. In reality on bending 180° C. as in FIG. 2 this is 1.2 to 1.5 times the thickness d of the laminate.

The thin, plastically formable composite laminate according to the invention is employed for the manufacture of bent and/or stretch drawn parts, in particular in automobile manufacture for bodywork parts or filters, for housings in equipment manufacture and for decorative elements in architectural applications.

Some examples of alloy compositions for the metal outer layers are presented in Table I. All provide very good quality thin composite laminates that can be plastically formed without difficulty.

TABLE I

| | | | Example of Alloys | | | | |
|---|---|---|---|---|---|---|---|
| Alloy | Casting method | Soaking temperature | Hot rolling | Cold rolling | Intermediate anneal | Cold rolling | Final Anneal |
| AlFeMn AA 8014 | DC continuous casting | — | 450–550° C. to 5–8 mm | 65–90% | poss. 350° C. | >70% | 250–380° C. |
| | Stripcasting | 500–550° C. | — | (>90%) to final thickness | — | — | 350–450° C. |
| AlMn AA 3003 | DC continuous casting | 600–630° C. | 400–520° C. to 5–8 mm | (>90%) to final thickness | — | — | 280–450° C. |
| | DC continuous casting | — | 400–520° C. to 5–8 mm | to final thickness | — | — | 250–300° C. |
| | Stripcasting | 530–600° C. | — | to final thickness | — | — | 280–450° C. |
| | Stripcasting | — | — | to final thickness | — | — | 250–300° C. |

What is claimed is:

1. A metal-plastic composite laminate which is readily plastically formable comprising a plastic sheet-like core having a pair of surfaces and at least one metal foil uniformly bonded to one of the surfaces of said plastic sheet-like core wherein said metal foil is formed of an aluminum alloy characterized by a flat stress-strain curve, said aluminum alloy consists essentially of from 0.8 to 1.5 wt.% of Fe; from 0 to 0.5 wt.% Mn; from 0 to 0.5 wt.% Si wherein the sum of Mn and Si is from 0.2 to 0.8 wt.%; up to 0.8 wt.% total of other elements which each individually do not exceed 0.3 wt.% in concentration; and the balance Al.

2. A composite according to claim 1 wherein said metal foil is about 0.05 to 1 mm thick and said core is about 0.5 to 3 mm thick.

3. A composite according to claim 1 wherein said metal foil is about 0.25 to 0.4 mm thick and said core is about 1.0 to 1.7 mm thick.

4. A composite according to claim 1 wherein metal foils are bonded to both surfaces and are of different thicknesses.

5. A composite according to claim 1 wherein the ratio of Fe to Mn is from 2.5 to 4.5.

6. A composite according to claim 1 wherein said aluminum alloy contains up to 0.1 wt.% each other element.

7. A composite according to claim 1 wherein said aluminum alloy is casted, hot rolled at an elevated temperature, cooled from the hot rolling temperature at a cooling rate of at least 0.5° C./second to a temperature below 120° C. and cold rolling to a thickness reduction of at least 75% without intermediate annealing.

8. A composite according to claim 1 wherein said core is formed of a material selected from the group consisting of polypropylene and polyethylene.

9. A composite according to claim 1 wherein an adhesive layer is provided between the metal foil and core, said adhesive layer comprises a copolymer of ethylene and ethylenic unsaturated carboncylic acid.

10. A composite according to claim 1 wherein said aluminum alloy contains greater than 1.1 wt.% Fe and greater than 0.25 wt.% Mn.

11. A composite according to claim 10 wherein the ratio of Fe to Mn is from 2.5 to 4.5.

12. A composite according to claim 11 wherein said aluminum alloy contains up to 0.1 wt.% each other element.

13. A composite according to claim 1 wherein said core is formed of a polyolefine.

14. A composite according to claim 13 wherein said core includes strengthening fibers.

* * * * *